United States Patent [19]

Schera, Jr.

[11] 3,907,334

[45] Sept. 23, 1975

[54] LINEAR ADJUSTABLE TELESCOPIC NIPPLE

[76] Inventor: Enos L. Schera, Jr., Miami, Fla.

[22] Filed: Nov. 4, 1974

[21] Appl. No.: 520,439

[52] U.S. Cl. .................. 285/20; 174/86; 285/302; 285/404; 403/104; 403/362
[51] Int. Cl.² ........................................ F16L 55/00
[58] Field of Search ......... 285/302, 404, 19, 20, 31, 285/32, DIG. 3; 403/104, 362, 109, 290, 106, 108, 110, 354, 378, 388, 167; 174/86, 65 R

[56] References Cited
UNITED STATES PATENTS

| | | | |
|---|---|---|---|
| 854,742 | 5/1907 | Hill | 403/104 |
| 982,836 | 1/1911 | Ley et al. | 285/302 |
| 1,050,473 | 1/1913 | Levan | 403/104 |
| 1,435,414 | 11/1922 | Morton | 403/110 |
| 1,652,677 | 12/1927 | McCoy et al. | 403/108 |
| 2,111,243 | 3/1938 | Hecht | 285/404 |
| 2,359,846 | 10/1944 | Hayman | 285/32 |
| 2,393,581 | 1/1946 | Wentworth | 285/19 X |
| 2,407,854 | 9/1946 | Steingard | 403/104 X |
| 2,560,150 | 7/1951 | Bateman | 285/DIG. 3 |
| 3,188,120 | 6/1965 | Peterson | 285/302 X |
| R25,929 | 12/1965 | Luenberger | 403/356 |

*Primary Examiner*—Thomas F. Callaghan

[57] ABSTRACT

A telescopic conduit nipple having a cylindrical outer tubular member with a linear slot therein parallel the axis thereof. One end of the outer member having an integral outer flange terminating in a male thread of predetermined pitch and length. An inner cylindrical tubular member slidably fitted for predetermined coaxial linear adjustment within the outer member with the outer end thereof having a coaxial outer flange terminating in a male thread of predetermined pitch and length including screw means through the slot and threaded into said inner member for locking the adjusted length of the nipple.

2 Claims, 6 Drawing Figures

US Patent  Sept. 23,1975  3,907,334

LINEAR ADJUSTABLE TELESCOPIC NIPPLE

This invention relates in general to armored electric power circuits and more particularly to conduit connections between various type metal junction boxes which have been secured in close adjacent relation prior to certain conduit connections, including other uses to be hereinafter described.

In many cases, electric junction boxes are secured in place and in some cases plastered around the outer periphery, and it is then exceedingly difficult to position required metal conduit connections between various types of boxes, whereas the use of the present invention is merely a simple matter of collapsing a predetermined size of the present telescopic nipple and then expanding same through the knock-out holes in the boxes to complete the circuitry required.

A further advantage resides in the relatively simple time saving procedure in other uses, such as for joining spaced ends of pre-installed conduits which are not installed with proper spacing for connection or termination for conductors.

The telescopic nipple hereinafter described may be manufactured in a wide variety of sizes at relatively low cost and the assembly and use thereof is elementary.

These and other objects and advantages in one embodiment of the invention are described and shown in the following specification and drawing, in which.

Figures 1, 2:
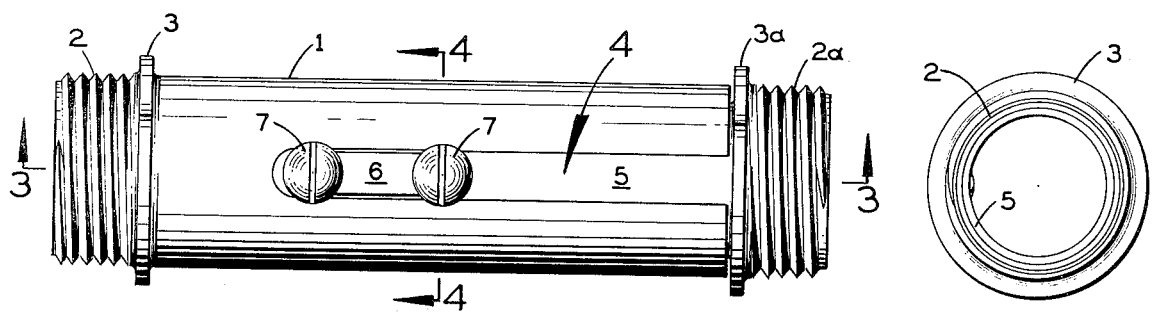
FIG. 1 is a side elevation of a typical telescopic nipple.
FIG. 2 is an end elevation of the nipple shown in FIG. 1.
Figures 3, 4:
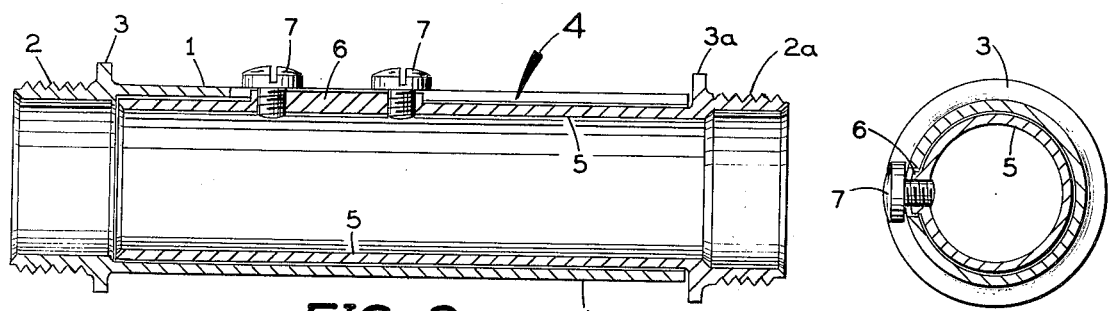
FIG. 3 is a cross sectional view taken through section line 3—3, FIG. 1.
FIG. 4 is a cross sectional view taken through section line 4—4, FIG. 1.

Referring to FIGS. 1, 2, and 3, the outer cylindrical portion 1 of the nipple has an integral threaded end portion 2 integral with a cylindrical flange 3 and shows a slot 4 which exposes an inner cylindrical sleeve portion 5 therein and has an integral guidance and screw receiving boss 6 through which a pair of like flat underhead or pan-headed screws 7—7 are threaded. The inner sleeve portion 5 also terminates in a threaded end portion 2a, the inner end of which terminates in an integral flange 3a.

Figure 5:
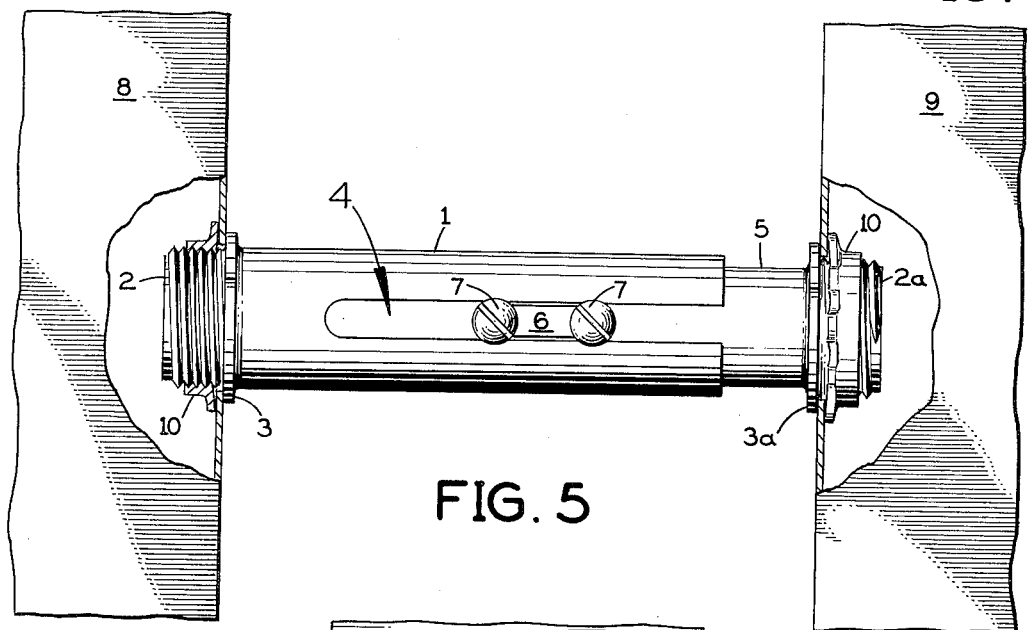
FIG. 5 illustrates the nipple adjustably connected between two metal boxes and retained therein by a self locking nut applied to opposite threaded ends of the nipple.
Figure 6:
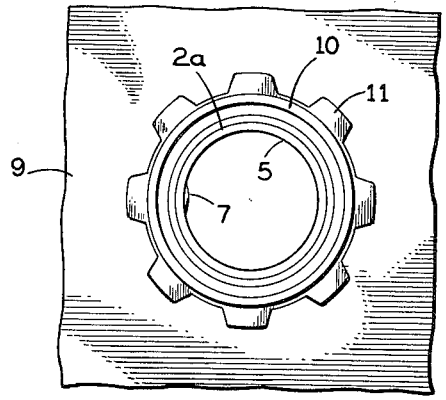
FIG. 6 illustrates an end elevation of one end of the nipple with the self locking nut in place within a junction box.

Referring to FIGS. 5 and 6, two boxes 8 and 9 are connected by the telescopic nipple and are secured by self locking nuts 10—10 threaded on opposite ends of the nipple.

FIG. 6 illustrates the lock nut applied to each outer threaded end of the nipple showing the twisted castle type nut with each castle projection 11 formed to provide self-locking of the nipple, when nuts are applied to the outer ends thereof.

It is apparent that the boss 6 is positioned to increase the strength of the female threads in sleeve portion 5 and also to resist the twisting action of the portion 5 within the outer cylindrical portion 1.

It is also apparent that the flanges 3 and 3a may have hexagonal outer shape or spanner openings to be rotated by suitable wrench means or a sequence of projections similar to nut 10 for anti-rotation purposes during the tightening of each of said nuts.

Although the manufacture of both tubular members in a selected number of sizes may be accomplished by several well known methods, die casting of one of several alloys is practical for quantity production at low cost.

It is to be understood that the opposite end portions of the nipple may be enlarged and coaxial female threads applied to the inner side of the outer portion of each telescopic member for joining the male matching threaded ends of two male threaded pipes.

It is also understood that boss 6 on the inner member may be eliminated when the wall thickness thereof is increased to provide sufficient numbers of threads for screws 7.

It is to be understood that certain other modifications are intended to come within the scope and teachings of the above specification.

Having described my invention, I claim:

1. In a telescopic nipple for connection between a pair of electrical junction boxes, said nipple having:
   an outer tubular member with a longitudinal slot therein which is open at one end of said outer member, said outer member having an attachment portion at its opposite end for connection to a first electrical junction box;
   and an inner tubular member slidably received inside said outer member, said inner member extending beyond said one end of the outer member and terminating thereat in an attachment portion for connection to a second electrical junction box;
   the improvement wherein
   said inner member has a radially outwardly-projecting boss thereon which is slidably received snugly in said slot in the outer member and is elongated lengthwise of said slot to prevent relative rotation between said outer and inner members while permitting relative longitudinal adjustment between them;
   and further comprising a screw-threaded member mounted in said boss and extending radially outward therefrom through said slot, said screw-threaded member carrying an enlargement on its outer end which extends transversely across said slot and is engageable with said outer member on opposite sides of said slot when turned down to lock the outer and inner members against longitudinal displacement relative to one another.

2. A telescopic nipple according to claim 1, wherein there are two screws located respectively near the opposite ends of said boss and threadedly mounted in said boss and having enlarged heads on their respective outer ends for clamping engagement with the outer member at respective locations which are appreciably spaced apart along the length of said slot.

* * * * *